(12) United States Patent
Choi

(10) Patent No.: US 7,457,645 B2
(45) Date of Patent: Nov. 25, 2008

(54) POWER SUPPLY APPARATUS OF MOBILE TERMINAL

(75) Inventor: Mu-Gon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 424 days.

(21) Appl. No.: 10/927,071

(22) Filed: Aug. 27, 2004

(65) Prior Publication Data

US 2005/0050234 A1    Mar. 3, 2005

(30) Foreign Application Priority Data

Sep. 2, 2003    (KR) .................. 10-2003-0061200

(51) Int. Cl.
H04B 1/38    (2006.01)

(52) U.S. Cl. .............. 455/572; 455/127.1; 713/300

(58) Field of Classification Search .............. 455/572, 455/573, 127.1, 343.1, 343.6, 574, 557; 713/300; 700/22
See application file for complete search history.

(56) References Cited

U.S. PATENT DOCUMENTS

| | | | |
|---|---|---|---|
| 6,334,160 B1 | 12/2001 | Emmert et al. ............. 710/11 |
| 6,362,610 B1 | 3/2002 | Yang ......................... 323/281 |
| 6,957,048 B2 * | 10/2005 | Formenti ................... 455/90.1 |
| 6,980,204 B1 * | 12/2005 | Hawkins et al. ............ 345/211 |
| 7,076,234 B2 * | 7/2006 | Grivas et al. .............. 455/343.1 |
| 2001/0006884 A1 * | 7/2001 | Matsumoto ................ 455/1 |
| 2003/0148797 A1 * | 8/2003 | Huang ....................... 455/573 |
| 2004/0063464 A1 * | 4/2004 | Akram et al. .............. 455/559 |
| 2004/0204177 A1 * | 10/2004 | Pon ........................... 455/573 |
| 2005/0014536 A1 * | 1/2005 | Grady ....................... 455/573 |

FOREIGN PATENT DOCUMENTS

| | | |
|---|---|---|
| CN | 2410806 Y | 12/2000 |
| JP | 2000-339067 | 12/2000 |
| JP | 2002-258989 | 9/2002 |
| KR | 2002-0080186 | 10/2002 |
| KR | 2003-0042681 | 6/2003 |
| KR | 2003-0047475 | 6/2003 |
| KR | 2003-0058745 | 7/2003 |

OTHER PUBLICATIONS

Chinese Office Action dated Dec. 9, 2005, issued in Chinese Patent Application No. 200410090320.7.

* cited by examiner

Primary Examiner—Blane J Jackson
(74) Attorney, Agent, or Firm—Ked & Associates, LLP

(57) ABSTRACT

A power supply apparatus supplies power to a mobile terminal through a USB (Universal Serial Bus). This power drives the terminal to perform USB communication functions even when an external power source of the terminal is disconnected or non-operational. Through this control technique, USB communications can be unlimitedly performed only with the USB cable regardless of capacity of the external power source. A problem that the terminal is turned off due to power shortage during data transmission and reception can therefore be prevented.

20 Claims, 3 Drawing Sheets

POWER SUPPLY APPARATUS OF MOBILE TERMINAL

BACKGROUND OF THE INVENTION

1. Field of the Invention

The present invention generally relates to a mobile terminal, and more particularly to a system and method for providing power to a mobile terminal.

2. Description of the Related Art

As mobile terminals provide users with enhanced services such as music, video, and games in addition to simple voice communications, data transmission and reception at faster rates and higher quality has become a critical matter. In order to quickly transmit large amounts of data, data transmission/reception methods which use a USB connection unit (interface) such as a USB port or a USB cable has become widely used.

FIG. 1 shows one type of power supply apparatus which has been proposed for use in a general terminal. This apparatus includes a voltage power (VPWR) 10 which powers operation of the terminal. The VPWR provides operation power from a battery typically in the range of 3.3-4.2 volts.

Power supplied by the VPWR is usually changed to about 2.5-12V by a low drop output (LDO) regulator 11 and this power level is then supplied to each part of the terminal. In general, 2.7V is supplied to a modem (MSM) 12 of the terminal, 2.7V to a receiving part (Rx part), 3.0V to an intermediate frequency unit and transmitter, 3.3V to an audio part, and 5.0V to a light emitting diode (LED).

While a carrier voltage for transmission of data supplied through a USB cable 13 from the USB power supply apparatus 15 is 5.0V, an MSM actuation voltage has a different value of usually 2.7V To resolve this difference, a USB transceiver 14 is generally used to match the transmission voltage of the USB cable 13 with the actuation voltage. A current signal including data information input through the USB cable 13 is matched by the USB transmitter/receiver 14, so that the carrier voltage is discarded and only data is transmitted to the MSM 12 by the MSM actuation voltage.

However, although a voltage of 5.0V is supplied through the USB cable 13, the USB transmitter/receiver 14 and the MSM 12 are in a disconnected state until the terminal system is booted by the VPWR 10, so communication with the terminal through the USB cable 13 is not possible. That is, in order to upload data from the USB interface to the terminal or download it, a power supply apparatus such as a battery or a mobile charger is necessary, since without it, it is not possible to transfer data or an information signal through the USB interface.

SUMMARY OF THE INVENTION

An object of the invention is to solve at least the above problems and/or disadvantages and to provide at least the advantages described hereinafter.

Another object of the present invention is to provide a power supply apparatus for a mobile terminal which supplies power using a carrier current of a universal serial bus (USB) cable.

To achieve these and/or other objects and advantages, the present invention provides a power supply apparatus of a mobile terminal including: a main power unit for supplying main power to operate a power circuit of a terminal; a sub-power unit connected to the terminal through a USB cable and supplying a current signal; and a switching unit connected to the main power unit and the sub-power unit and selectively controlling one power unit to an ON state. Preferably, the switching unit includes a first multiplexer for receiving operation power from the main power unit; and a second multiplexer for receiving operation power from the sub-power unit. Also, it is preferable that if both main power unit and sub-power unit are in an ON state, terminal operation power is supplied by the main power unit.

DETAILED DESCRIPTION OF THE PREFERRED EMBODIMENTS

Figure 1:
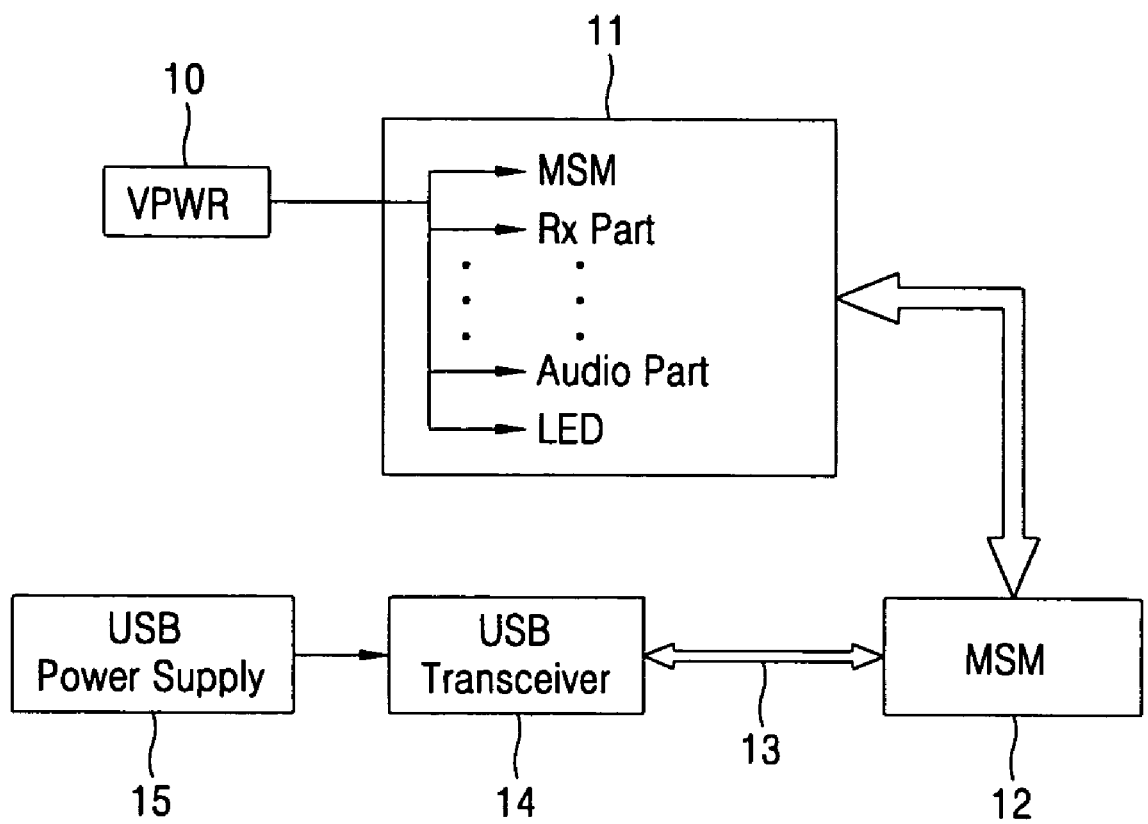
FIG. 1 shows one type of power supply apparatus which has been proposed for use in a general terminal.
Figure 2:
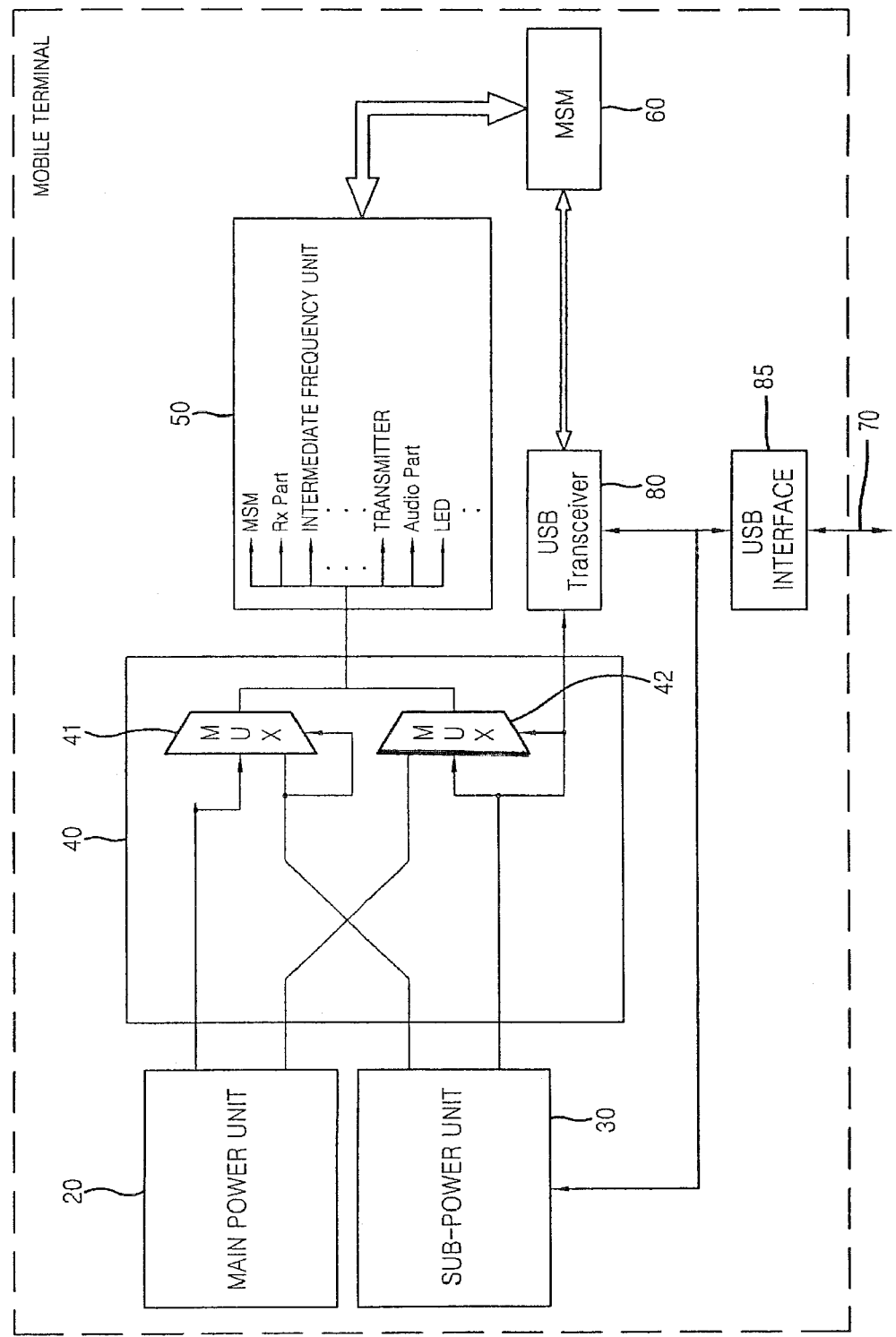
FIG. 2 shows a power supply apparatus of a mobile terminal in accordance with a preferred embodiment of the present invention.

FIG. 2 shows a power supply apparatus for an electronic device including but not limited to a mobile communication terminal in accordance with a preferred embodiment of the present invention. In accordance with at least this embodiment, if a main power unit of the mobile terminal is in an OFF state, the mobile terminal can be booted by a data carrier current of a USB cable.

More specifically, as shown in FIG. 2, a power supply apparatus of the mobile terminal in accordance with the present invention includes: a main power unit 20 for supplying main power to operate a power circuit of a terminal; a sub-power unit 30 connected to the terminal and supplying a power (e.g., current) signal to the terminal from a USB cable 70; and a switching unit 40 connected to the main power unit 20 and the sub-power unit 30 for controlling one of the power units to an ON state.

The main power unit 20 supplies voltage power (VPWR) of an external power source such as a battery, a travel charger, or the like, as a terminal operation power.

The sub-power unit 30 is a USB power source which supplies a power Signal from a connected USB cable 70. This unit may provide any voltage necessary to meet the operating requirements of the terminal. For illustrative purposes, the sub-power unit may provide 5.0V.

The switching unit 40 includes a first multiplexer 41 for receiving operation power from the main power unit 20 and a second multiplexer 42 for receiving operation power from the sub-power unit 30. The first and second multiplexers are preferably analog multiplexers. Other types of switching arrangements may be used if desired.

The two multiplexers are preferably installed in switching unit 40 in order to prevent a short between two power units, which are different in their voltage supplies, when turned on. The switching unit may also be configured to supply an operation voltage from the sub-power unit if the main power unit is in an OFF state. This may be accomplished by coupling each multiplexer to the main and subpower units through separate signal paths.

In general, multiplexers are data select logical circuits for selecting and then outputting one signal from a plurality of circuits. Frequently, these circuits are also called MUXs. Several devices can share one dedicated line by using the multiplexer. A multiplexer may also correspond to communication equipment used when a phone circuit is used as a communication medium together with a modem. This type of multiplexer offers the advantages of simplifying the communication network configuration and management, thereby considerably reducing communication costs. Other types of multiplexer arrangements are known and can be used in accordance with the present invention.

In the preferred embodiment of the present invention, when power is supplied by sub-power unit 30, power supply from main power unit 20 is stopped and first multiplexer 41 controls power differently according to the ON/OFF state of the sub-power unit. For example, if only the main power unit is in the ON state, main power becomes high and sub-power becomes low, so a logical value of the main power unit input to the first multiplexer 41 is 1 and a logical value of the sub-power unit input to the second multiplexer is 0. Thus, in this case, operation power is applied to the terminal by the main power unit.

Conversely, if only the sub-power unit is in the ON state, main power becomes low and the sub-power becomes high, so a logical value of the main power unit input to the first multiplexer 41 is 0 and a logical value of the sub-power unit inputted to the second multiplexer 42 is 1. Thus, in this case, operation power is applied to the terminal by the sub-power unit.

If both the main power unit 20 and the sub-power unit 30 are in the ON state, their logical values are both 1. In this case, power supply of the sub-power unit takes priority so terminal operation power is applied by the sub-power unit. (In an alternative embodiment, the main power unit may take priority under these conditions.)

When power from one of the main power unit and sub-power unit is selected by the first and second multiplexers 41 and 42, the selected power is converted into a voltage within a predetermined range (e.g., 2.5V-12V) so as to be supplied to all or a portion of the parts of the terminal by a low drop output (LDO) regulator 50. For example, 2.7V may be supplied to a mobile station modem (SM) 60, 2.7V to a receiving part (Rx part), 3.0V to each of an intermediate frequency unit and transmitter, 3.3V to an audio part, and 5.0V to a light emitting diode (LED).

Data transmitted via USB cable 70 after passing through the USB transmitter/receiver 80 is transferred to MSM 60 by the MSM operation voltage of 2.7, and a carrier voltage of USB cable 70 is used as power for operation of the terminal as mentioned above without being discarded.

Figure 3:
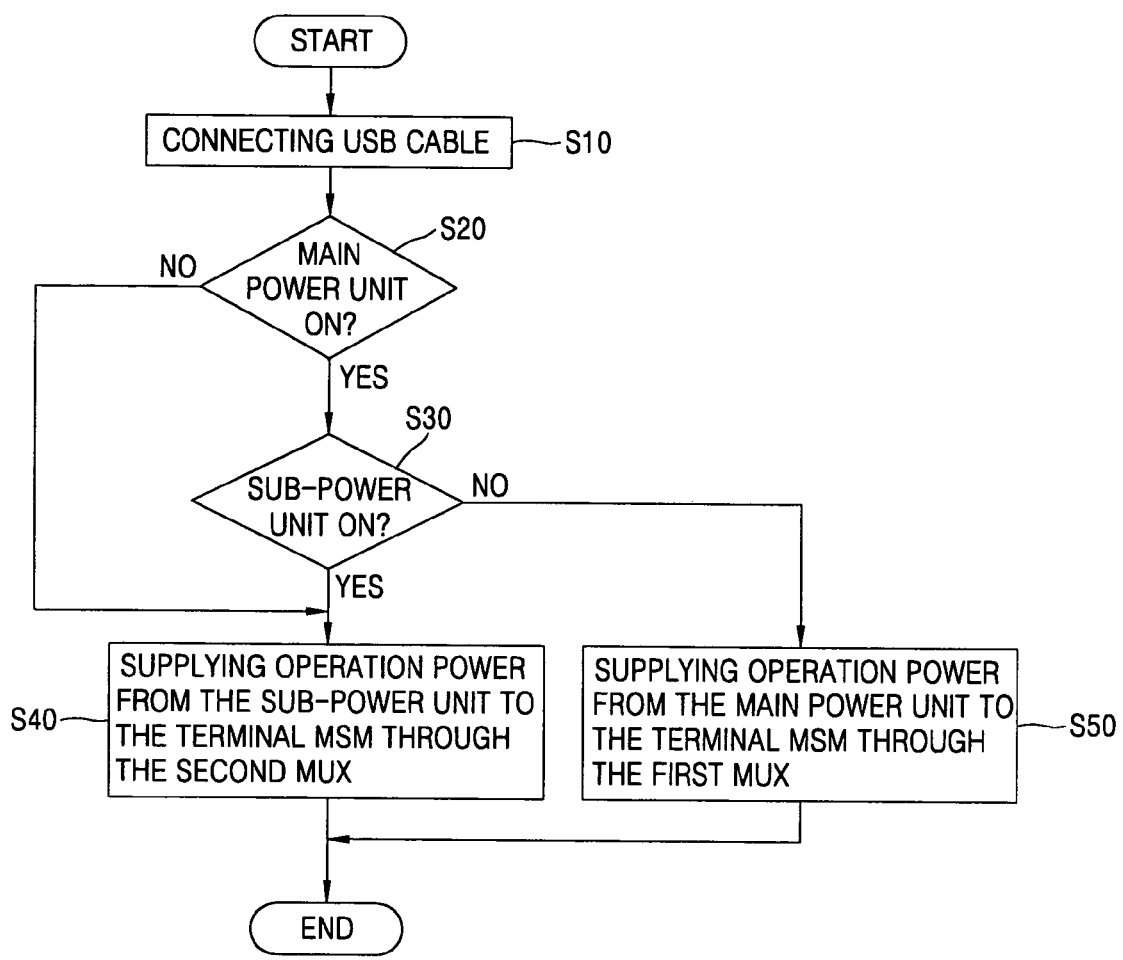
FIG. 3 is a flow chart showing steps included in a process for implementing the power supply apparatus in accordance with the preferred embodiment of the present invention.

FIG. 3 is a flow chart showing steps included in a process for implementing the power supply apparatus of a mobile terminal in accordance with the preferred embodiment of the present invention.

When a carrier current of USB cable 70 is desired to be used as operation power of the terminal, the USB cable is connected to the USB interface 85 of the terminal (step S10).

Next, it is checked whether main power unit 20 of the terminal is in an ON state (step S20). If the main power unit is in the ON state, it is checked whether sub-power unit 30 is in an ON state (step S30). If the sub-power unit is in the ON state, an operation voltage Vcc is supplied to the MSM of the terminal through the second multiplexer (step S40); that is, sub-power unit 30 provides power to the MSM.

If, however, the main power unit is in the ON state and the sub-power unit is in an OFF state, an operation voltage Vcc is supplied to the MSM through the first multiplexer (step S50); that is, manpower unit 20 provides power to the MSM.

If the main power unit is in the OFF state, operation voltage Vcc is supplied to the MSM through the second multiplexer 42 (step S40); that is, sub-power unit 30 provides power to the MSM.

As so far described, the power supply apparatus of the mobile terminal in accordance with the present invention has many advantages. For example, even without an external power source such as a battery, the terminal can be driven using USB power supplied through a USB cable to perform USB communication functions. In addition, the USB communications can be unlimitedly performed with only the USB cable under a variety of conditions, e.g., regardless of a capacity of an external power source, a problem that the terminal is turned off due to power shortage during data transmission thus preventing reception, as well as under other conditions.

The mobile terminal described herein may be any one of a variety of electronic devices including but not limited to a mobile communications terminal, a cordless telephone or other communication device, a personal digital assistant equipped, or any other device (mobile and non-mobile) equipped with or otherwise adapted to receive signals from a USB port or cable.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A power supply apparatus comprising:
a main power circuit which supplies power to a mobile terminal;
a sub-power circuit which supplies power to the mobile terminal from a USB cable; and
a switching circuit which outputs power to the terminal based on operational states of the main power circuit and sub-power circuit, wherein the sub-power circuit supplies power to the mobile terminal from the USB cable through the switching circuit, wherein the switching circuit comprises:
a first multiplexer for receiving power from the main power unit, and
a second multiplexer for receiving power from the sub-power unit, and wherein the sub-power circuit supplies operation power to a USB transmitter/receiver without the power passing through the second multiplexer.

2. The apparatus of claim 1, wherein the main power circuit includes a power source.

3. The apparatus of claim 2, wherein the power source is one of a battery and travel charger.

4. The apparatus of claim 1, wherein the first and second multiplexers are analog multiplexers.

5. The apparatus of claim 1, wherein if the main power circuit is in an ON state and the sub-power circuit is in an OFF state, the main power circuit supplies an operation voltage to the first multiplexer so that operation power of the terminal is supplied through output of the first multiplexer.

6. A power supply apparatus, comprising:
a main power circuit which supplies power to a mobile terminal;
a sub-power circuit which supplies power to the mobile terminal from a USB cable; and
a switching circuit which outputs power to the terminal based on an ON state of at least one of the main power circuit or the sub-power circuit, the switching circuit including:
a first multiplexer to receive power from the main power circuit, and
a second multiplexer to receive power from the sub-power circuit, wherein if the main power circuit is in the ON state and the sub-power circuit is in the OFF state, a first logical value from the main power circuit is input into the first multiplexer and a second logical value from the sub-power circuit is input into the second multiplexer to control switching of power to the terminal, wherein the sub-power circuit supplies power from the USB cable to the mobile terminal through the switching circuit.

7. A power supply apparatus, comprising:
a main power circuit which supplies power to a mobile terminal;
a sub-power circuit which supplies power to the mobile terminal from a USB cable; and
a switching circuit which outputs power to the terminal based on an ON state of at least one of the main power circuit or the sub-power circuit, the switching circuit including:
a first multiplexer to receive power from the main power circuit, and
a second multiplexer to receive power from the sub-power circuit,
wherein if the main power circuit is in the OFF state and the sub-power circuit is in the ON state, a first logical value from the main power unit is input into the first multiplexer and a second logical value from the sub-power circuit is input into the second multiplexer to control switching of power to the terminal, wherein the sub-power circuit supplies power from the USB cable to the mobile terminal through the switching circuit.

8. A power supply apparatus, comprising:
a main power circuit which supplies power to a mobile terminal;
a sub-power circuit which supplies power to the mobile terminal from a USB cable; and
a switching circuit which outputs power to the terminal based on an ON state of at least one of the main power circuit or the sub-power circuit, the switching circuit including:
a first multiplexer to receive power from the main power circuit, and
a second multiplexer to receive power from the sub-power circuit,
wherein if the main power circuit is in the ON state and the sub-power circuit is also in the ON state, a first logical value from the main power circuit is input into the first multiplexer and a second logical value from the sub-power circuit is input into the second multiplexer to control switching of power to the terminal.

9. A power supply apparatus of a mobile terminal comprising:
a first switch coupled to an external power source;
a second switch coupled to a USB supply power source; and
a circuit which selects one of the first or second switches to couple the external power source or the USB supply power source to the terminal for providing operation power, wherein the second switch supplies power from the USB supply power source from a USB cable for powering the mobile terminal and wherein:
the first and second switches include first and second multiplexers respectively,
the first multiplexer provides power to the terminal from the external power source and the second multiplexer provides power to the terminal from the USB supply power source from a USB cable, and
if the USB supply power source is in the ON state, a first logical value is input to the second multiplexer from the USB supply power source, and if the USB supply power source is in the OFF state a second logical value is input to the second multiplexer from the USB supply power source to control power selection.

10. The apparatus of claim 9, wherein if the external power source is in an ON state and the USB supply power source is in an OFF state, the first multiplexer supplies an operation voltage to power the terminal.

11. The apparatus of claim 9, wherein if the USB supply power source is in an ON state, the second multiplexer supplies an operation voltage to power the terminal regardless of an ON/OFF of the external power source.

12. A power supply apparatus of a mobile terminal, comprising:
a first switch coupled to an external power source;
a second switch coupled to a USB supply power source; and
a circuit which selects one of the first or second switches to couple the external power source or the USB supply power source to the terminal for providing operation power, wherein the first and second switches include first and second multiplexers respectively,
wherein the first multiplexer provides power to the terminal from the external power source and the second multiplexer provides power to the terminal from the USB supply power source received through a USB cable, and
wherein if the external power source is in the ON state, a first logical value is input to the first multiplexer from the external power source, and if the external power source is in the OFF state a second logical value is input to the first multiplexer from the external power source to control power selection.

13. The apparatus of claim 9, wherein the first and second switches are analog multiplexers.

14. A power supply apparatus of a mobile terminal comprising:
a first switch coupled to an external power source;
a second switch coupled to a USB supply power source; and
a circuit which selects one of the first or second switches to couple the external power source or the USB supply power source to the terminal for providing operation power, wherein the first and second switches include first and second multiplexers respectively, and wherein the USB supply power source supplies operation power directly to a USB transmitter/receiver without passing through the second multiplexer.

15. A power supply apparatus, comprising:
a main power circuit which supplies power to a mobile terminal;
a sub-power circuit which supplies power to the mobile terminal from a USB cable; and
a switching circuit which outputs power to the terminal based on operational states of the main power circuit and sub-power circuit, wherein the sub-power circuit supplies power to the mobile terminal from the USB cable when the main power unit is in an OFF state the switching circuit including:
a first multiplexer to receive power from the main power circuit, and
a second multiplexer to receive power from the sub-power circuit,
wherein if the main power circuit is in the ON state and the sub-power circuit is in the OFF state, a first logical value from the main power circuit is input into the first multiplexer and a second logical value from the sub-power circuit is input into the second multiplexer to control switching of power to the terminal, wherein the sub-power circuit supplies power from the USB cable to the mobile terminal through the switching circuit.

16. The apparatus of claim 15, wherein the power from the sub-power circuit is a USB cable carrier current which boots the terminal when the main power circuit is in the OFF state.

17. The apparatus of claim 1, wherein the power from the main power circuit and the power from the sub-power circuit provide different levels of operation power to the terminal.

18. The apparatus of claim 1, wherein the main power circuit and the sub-power circuit are coupled to the switching circuit through separate signal paths, said separate paths isolating the main power circuit from the sub-power circuit.

19. A power supply apparatus, comprising:
a main power circuit which supplies power to a mobile terminal;
a sub-power circuit which supplies power to the mobile terminal from a USB cable; and
a switching circuit which outputs power to the terminal based on operational states of the main power circuit and sub-power circuit, wherein the sub-power circuit supplies power to the mobile terminal from the USB cable through the switching circuit, wherein the switching circuit comprises:
a first multiplexer for receiving power from the main power unit, and
a second multiplexer for receiving power from the sub-power unit, and wherein the power from the sub-power circuit is a current signal received from the USB cable and supplied through the switching unit without passing through the second multiplexer.

20. The apparatus of claim 1, wherein said operation power is included in a current signal supplied to the mobile terminal from the USB cable.

* * * * *